United States Patent [19]

Ochi et al.

[11] Patent Number: 4,759,802

[45] Date of Patent: Jul. 26, 1988

[54] CEMENT DISPERSION AGENT

[75] Inventors: Yasusuke Ochi; Tatsuya Mizunuma; Kimio Kurosaka, all of Wakayama; Tatsuo Izumi, Izumisano; Shuichi Fujita, Wakayama, all of Japan

[73] Assignee: Kao Corporation, Tokyo, Japan

[21] Appl. No.: 925,341

[22] Filed: Oct. 31, 1986

[30] Foreign Application Priority Data

Nov. 7, 1985 [JP] Japan .................................. 60-249862

[51] Int. Cl.$^4$ ............................................. C04B 24/22
[52] U.S. Cl. ...................................... 106/314; 106/90; 524/2; 524/593; 528/232; 528/247; 528/265
[58] Field of Search ...................... 106/90, 314; 524/2, 524/593; 528/232, 234, 235, 247, 265

[56] References Cited

FOREIGN PATENT DOCUMENTS

| 2445813 | 4/1976 | Fed. Rep. of Germany ........ 106/90 |
| 43-11783 | 5/1968 | Japan ..................................... 106/90 |
| 59-88353 | 5/1984 | Japan ..................................... 106/314 |

*Primary Examiner*—Steven Capella
*Attorney, Agent, or Firm*—Flynn,, Thiel, Boutell & Tanis

[57] ABSTRACT

A hydraulic cement composition is effectively dispersed with the use as a dispersion agent of a reaction product obtained by oxidizing and polymerizing a condensate of formaldehyde with a naphthalenesulfonic acid salt and-/or an alkylnaphthalenesulfonic acid salt to produce a constitutional unit which is derived by elimination of a methylene group, hydroxyzation and condensation polmerization, or oxidation and ring-opening of the naphthalene ring.

13 Claims, No Drawings

CEMENT DISPERSION AGENT

BACKGROUND OF THE INVENTION

1. Field of the Invention

This invention concerns a dispersion agent for cement or blended cement materials and, more specifically, it relates to a cement dispersion agent capable of greatly improving the workability of concretes, mortars or pastes as the hydraulic cement blends thereby improving the applicability and the operationability thereof or to a cement dispersion agent capable of highly decreasing the unit amount of water and obtaining high strength.

2. Description of the Prior Art

Chemical admixtures that have usually been employed so far can include lignin sulfonic acids (salts thereof), oxycarboxylic acids (salts thereof), polycarboxylic acids (salts thereof), naphthalene sulfonic acid—formaldehyde condensates (salts thereof), and melamine sulfonic acids—formaldehyde condensates (salts thereof).

Among them, naphthalene sulfonic acid-formaldehyde condensates (salts thereof) and melamine sulfonic acid-formaldehyde condensates (salts thereof) have been used as chemical admixture causing less delay in curing, no air entrainment and having high dispersibility.

However, the dispersibility of them at an addition amount of less than 0.2% by weight to cements (in a low addition region) is considerably lower than that of sulfonic acids (salts thereof), oxycarboxylic acids (salts thereof), polycarboxylic acids (salts thereof) and the like. They are not used for raw concretes of medium to low strength or concrete plant products from an economical point of view. While on the other hand, their dispersibility at an addition amount of greater than 0.4% by weight to cements (in a high addition region) is equal to or greater than than that of the above-mentioned chemicals. Further, since they also have a feature of causing less delay in the curing and with no air entrainment even in the high addition region, they have been used for raw concretes at high strength or concrete plant products. However, a further improvement in the dispersibility is desired from an economical point of view. For the further improvement of the dispersibility without giving the undesired effects of delay in the curing and air entrainment, there has been been reported a separation method (refer to Japanese Patent Laid-Open No. Sho 58-176158), oxidizing treatment (refer to, for example, Japanese Patent Laid-Open No. Sho 60-33239), etc.

However, the dispersibility can not be improved as expected by merely controlling the molecular weight distribution by removing the high molecular weight portion and/or low molecular weight portion by the separation method. Further, since the materials removed by the method have no effective application uses, this method is disadvantageous also from an economical point of view. Further, although the introduction of carboxylic groups into sulfonic acid type compounds through oxidation is an effective method of improving the dispersibility, control of the molecular weight distribution by which the low molecular weight portion, with less effect for the improvement of the dispersibility, is converted into a higher molecular portion can not be attained merely by oxidation.

As described above, it has been impossible to control the distribution of the molecular weight while introducing, at the same time, carboxylic groups for further improving the dispersibility without giving the undesired effects of delaying curing and causing air entrainment. The present inventors have made a further study on a method capable of controlling the molecular weight effective for the improvement of the dispersibility by merely conducting the chemical reaction without effecting the separating operation as in the prior art method and which is capable of moderately introducing carboxylic groups effective to the improvement of the dispersibility and have arrived at this invention.

SUMMARY OF THE INVENTION

The invention has a purpose of an improvement in a hydraulic cement composition or a watercurable cement composition with the use of a cement dispersing agent or a cement dispersion agent comprising a product prepared by oxidizing and polymerizing a condensate of a naphthalene sulfonic acid salt and/or an alkyl naphthalene sulfonic acid salt with formalin or formaldehyde containing, as a main constitutional unit, represented by the formula:

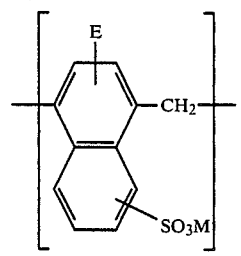

(where E represents H or an alkyl group of 1 to 3 carbon atoms, M represents an alkali metal, alkaline earth metal or amine), wherein the product contains:

(I) from 1 to 30 mol % of the following structural unit formed by cutting the methylene group through oxidation:

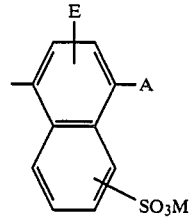

(where A represents, OH, CH$_2$OH or COOH,
(II) from 1 to 30 mol % of at least one of the following constitutional units prepared by hydroxylation/polycondensation:

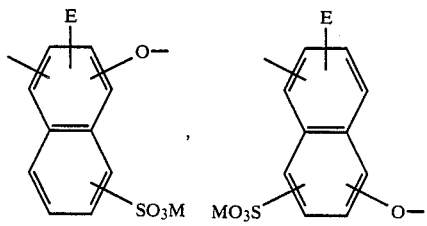

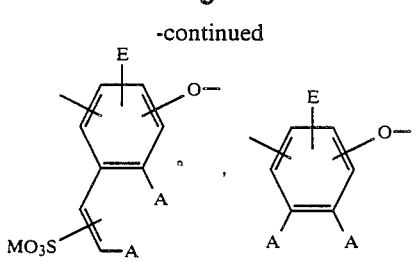

(III) from 1 to 30 mol % of at least one of the following constitution units prepared as oxidative splitting of naphthalene rings:

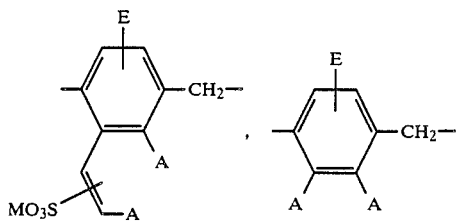

and the balance of not-modified structural units and other structural units.

A cement dispersion agent of the invention is defined also by comprising a product prepared by oxidizing and polymerizing a condensate with formaldehyde of a naphthalenesulfonic acid salt or an alkyl-naphthalenesulfonic acid salt, said condensate containing a main constitutional unit having the above shown formula, said product comprising (I) 1 to 30 mol percent of a constitutional unit having the above shown formula, produced by the oxidation and elimination of a corresponding methylene group,
(II) 1 to 30 mol percent of one or more of constitutional units having the respective formulae as shown above, produced by hydroxylation and condensation polymerization, (III) 1 to 30 mol percent of one or more of constitutional units having the respective formulae as shown above, produced by the oxidation and the ring-opening of the naphthalene ring, and the balance of a constitutional unit not modified and/or another unit.

It is preferable that the product contains 10 to 60 mol percent of the constitutional units (I), (II) and (III) and the product contains 5 to 15 mol percent of the unit (I), 5 to 15 mol percent of the unit (II) and 5 to 15 mol percent of the (III).

It is preferable that the salt is a salt with sodium, potassium, calcium, ammonium, an alkanolamine, N-alkyl-substituted polyamine, ethylene diamine, polyethylenepolyamine, polyethyleneimine or an alkylene oxide adduct.

The invention further provides a method for dispersing a hydraulic cement composition with the use of the product as defined above. The agent is added to a hydraulic cement composition in an amount of 0.1 to 1.5 percent by weight of the solid content. Moreover the agent is preferably used in combination with a slump-loss preventing polymer agent selected from polycarboxylic acid, lignin sulfonic acid, a water-soluble polymer, a condensate of melamine sulfonic acid with formaldehyde and a salt thereof.

The main constitutional unit in this invention comprises a condensate of a naphthalene sulfonic acid salt or alkyl naphthalene sulfonic acid salt with formaldehyde, and may also contain a copolycondensate of naphthalene sulfonic acid and alkyl naphthalene sulfonic acid with fomaldehyde or a polycondensated salt with lignin sulfonic acid.

In the oxidizing and polymerizing reaction of this invention, a reaction accompanying an electron transfer can generally be utilized. They can include, for example, reaction with metal ions and water-soluble peroxides, reaction with ozone, electrochemical reaction and photochemical reaction.

As an example, there can be mentioned a method of oxidizing and polymerizing a condensate of naphthalene sulfonic acid or alkyl naphthalene sulfonic acid with formaldehyde using metal ions as a catalyst and a water-soluble peroxide. By the oxidizing and polymerizing reaction, a product containing the constituent units as defined in the above formula (I), (II) and (III) from 1 to 30 mol % respectively in the molecule can be obtained. Specifically, the distribution of the molecular weight can be controlled to obtain a compound in which carboxylic groups are increased from 0 to 0.1–10 mol/kg and the molecular weight distribution characteristics F 300–27500 are from 70 to more than 80% by weight. Further, naphthalene sulfonic acid, alkyl naphthalene sulfonic acid or the salts thereof can be reduced from 3 mol % to less than 1.0 mol %.

Further, the molecular weight distribution of the condensate of naphthalene sulfonic acid or alkyl naphthalene sulfonic acid with formaldehyde or the salts thereof used in this invention can be determined by separation and collection by means of gel permeation chromatography using sodium polystyrene sulfonate as a standard substance.

The term "F300-27500" showing the molecular weight distribution characteristics used in this specification means such characteristics as determined by the gel permeation chromatographic measurement in which a gel permeation chromatography column TSKgelG3000SW for separation (manufactured by Toyo Soda Kogyo K.K.) and TSKgelG2000 SW (manufactured by Toyo Soda Kogyo K.K.) for separation are combined wherein retention time for the average molecular weights 300–27500 are calibrated based on the calibration line prepared by using a standard specimen of sodium polystyrene sulfonate for use in gel permeation chromatography (manufactured by Showa Denki Kogyo K.K), fractions issued during the retention time are collected and the weight of the condensate of naphthalene sulfonic acid or alkyl naphthalene sulfonic acid with formaldehyde contained therein (or the salt thereof) were determined by using spectrophotometer. The weight is indicated as a percentage based on the weight before the measurement.

The carboxylic groups were measured by the electroconductivity titration by using N/10 ammonia solution after converting the reaction product into the state of the carboxylic acid by using an ion exchange resin.

The oxidizing and polymerizing reaction in this invention is apparently different from the oxidizing reaction disclosed in Japanese Patent Laid-Open No. Sho 60-33239 in that the control for the molecular weight distribution and the introduction of the carboxylic group can be conducted merely by chemical reaction.

The oxidizing conditions in the case of the oxidizing and polymerizing reaction in this invention with metal ions and water-soluble peroxides are such that 100 parts by weight of the condensate comprising naphthalene sulfonic acid and/or alkyl naphthalene sulfonic acids with formaldehyde are dissolved in from 200 to 2000 parts by weight of water, from 0.1 to 20 parts by weight of metal ions are added within a temperature range from room temperature to lower than the boiling point and, further, from 5 to 100 parts by weight of the water-soluble peroxides are added dropwise. While there is no particular restriction for the pH value in this case, an acidic pH is generally preferred.

As the naphthalene sulfonic acids or alkyl naphthalene sulfonic acids in this invention, there can be used creosote oils, naphthalene oils, broady liquid residue, purged naphthalene or pitch produced in the coking of coals, or sulfonated products of liquefied coal oils. Further, the naphthalene sulfonic acid or alkyl npahthalene sulfonic acid may also partially contain unsulfonated compounds.

As the water-soluble peroxides, one or more of peroxides selected from inorganic peroxides or organic peroxides are preferred. For instance, there can be mentioned inorganic peroxides such as hydrogen peroxide, calcium oxide, barium oxide, persulfates (salts) such as ammonium persulfate, as well as organic peroxides such as percarboxylates (salts thereof) such as perbenzoxylate and peracetate, persulfonates (salts thereof), perphosphates (salts thereof) and organic peroxides such as methylhydro peroxide, ethylhydro peroxide, propylhydro peroxide and butylhydro peroxide. Transition metal ions are preferred as the metal ions and they include, for example, those ions of silver, cobalt, cerium, manganese, iron, copper, molybdenum, tungsten, vanadium, titanium, chromium, lead, thalium, mercury, nickel, platinum, selenium, osmium and zinc. These transition metal ions are preferably used in the form of salts, complex salts or oxides. As with the oxidizing and polymerizing reaction conditions in the case of the reaction with ozone in this invention, the same starting materials as those for metal ions and water-soluble peroxides are used, and ozone-containing gases evolved from air or oxygen are blown in the form of bubbles as fine as possible at a temperature near the room temperature. Although there is no particular restriction for the pH value, from neutral to alkaline pH is preferred.

In the oxidizing and polymerizing reaction in this invention by way of photochemical reaction, the same starting materials as that for the metal ions and the water-soluble peroxides are used and light at a wavelength of less than 350 nm is irradiated. Although the use of the catalyst may be saved, it is preferred to use salt, complex salt or oxide of the transition metal ion as a catalyst. Further, although there is no particular restriction for the pH value, acidic pH range is preferred. Further, there is also no particular restriction for the temperature provided that it is within a range from the room temperature to a temperature lower than the boiling temperature, the temperature about at the room temperature is preferred in view of the working life of the light emitting lamp.

In this invention, it is necessary that the content of the constitutional units as defined by (I), (II) and (III) in the cement dispersion agent are from 1 to 30 mol % respectively and, preferably, from 5 to 15 mol % respectively. If any one of the constituents is less than 1 mol %, it is not effective for the improvement in the dispersibility.

In this invention, it is preferred that the constituent units defined by the foregoing (I), (II), (III) preferably contain from 10 to 60 mol % of these three units, more preferably, from 20 to 50 % in total. Constitutional units other than those defined by (I), (II) and (III) are mainly composed of a not-modified condensate of naphthalene sulfonic acid or alkyl naphthalene sulfonic acid with formaldehyde. They also include various structures derived from impurities in the starting material or due to the side reactions in the oxidization and polymerization. The sub-produced constitutional units can not clearly be defined by the formula, but the total content of such undefinable constituents is about less than 5 mol % as the total.

Although the reason why the compound according to this invention shows an extremely high dispersing effect as the cement dispersion agent has not yet been clear at present, it can be assumed for instance as below.

That is, the dispersion of cements by the dispersion agent is determined by the balance between the electrical repulsion of charged cement particles and the cohesion of the dispersion agent that adsorbs and crosslinks the cement particles to each other. Accordingly, the dispersibility can further be improved by increasing the electrical repulsion and decreasing the cohesion.

Since highly adsorbing carboxylic groups can be introduced in addition to the sulfonic acid through oxidizing and polymerizing reaction by the cement dispersion agent according to this invention, the adsorption amount of the cement is increased, as well as the surface potential on the cement particles is increased to improve the electrical repulsion. Further, since the ratio of the high molecular weight substance greater than the molecular weight distribution characteristics F27500 is decreased in the cement dispersion agent according to this invention, the cohesion is decreased. Further, low molecular weight substances with the molecular weight distribution characteristics less than F300 or those monomer substances such as naphthalene sulfonic and/or alkylene naphthalene sulfonic acid or the salt thereof are decreased and their molecular weight is increased as that for the polymers or copolymers of the aromatic compounds which are effective to the dispersibility and the effective ingredient content is increased. It is considered that the three factors as described above are combined to improve the dispersibility.

While the cement dispersion agent according to this invention can be used in the form of the acid, it is generally preferred to use the agent in the form of a salt. The salt forming cations can include, for example, sodium, potassium, calcium, ammonium, alkanol amine, N-alkyl substituted polyamine, ethylenediamine, polyethylenepolyamine, polyethyleneimine or alkylene oxide adducts thereof.

The addition amount of the cement dispersion agent in this invention is preferably from 0.1 to 1.5% by weight of the solid content of the hydraulic cement composition. No sufficient dispersing effect can be provided to the cement particles if the solid content is less than 0.1% by weight. On the other hand, if the solid content exceeds 1.5% by weight, the cement particles are dispersed excessively to bring about the separation of pastes or increased bleeding.

The cement dispersion agent in this invention can be added to the cement blend either in the form of an aqueous solution, powder or particles. It can be added at the time of dry blending with the cement, dissolution into mixing water upon starting of the kneading of the cement blend, that is, simultaneously with or just after the pouring of water into cements to the completion of the kneading of the cement blend. Further, it can also be added to the cement blend once kneaded. Further, the dispersion agent according to this invention can be added all together or divisionally over several times.

While the cement dispersion agent of this invention is poor in the slump loss preventing performance, the slump loss preventing performance can be improved by blending a high molecular ingredient with the dispersion agent of this invention. The high molecular ingredient effective to the improvement for the slump loss preventing performance can include, for example, polycarboxylic acid or the salts thereof, lignin sulfonic acids or the salts thereof, water-soluble high polymers, melamine sulfonic acid—formalin condensates or the salts thereof.

The polycarboxylic acids or the salts thereof in this invention can include, for example, those compounds having from 1000 to 100000 average molecular weights comprising polymers of one or more polymerizable monomers or anhydrides thereof containing carboxylic groups, or copolymers of one or more of carboxylic-containing polymerizable monomers or the anhydrides, thereof with other polymerizable monomers or the salts thereof. For instance, there can be mentioned copolymers of polyacrylic acid salts, polymethacrylic acid salts, acrylic acid with allyl ether and copolymers of -olfein and ethylenically unsaturated dicarboxylic acid. Preferred blending ratio between the cement dispersion agent of this invention and the polycarboxylic acids or the salts thereof are from 99:1 to 30:70 (weight ratio), preferably from 90:10–40:60 (weight ratio). If the blending ratio of the polycarboxylic acid or the salt thereof is less than 1, it is not effective for the prevention of slump loss and, if it is more than 70, remarkable delay occurs in the coagulation and the amount of entrained air is increased remarkably.

As the lignin sulfonic acid or the salt thereof used in this invention, those lignin sulfonic acids usually employed as a chemical admixture can be used, but pure lignosulphonate of a nature having analytical values and the molecular weight distribution nearer to those as disclosed in pages 5-9 of Chemical Admixtures for Concrete (M. R. RIXOM, E & F. N. Spon Ltd.) are preferred. Preferred blending ratios between the cement dispersion agent and the lignin sulfonic acid or the salt thereof in this invention are from 95:5 to 30:70 (weight ratio), preferably it is from 90:10 to 40:60 (weight ratio). If the lignin sulfonic acid or the salt thereof is less than 5, it is not effective for the prevention of the slump loss. While on the other hand, if it is more than 70, remarkable delay is resulted in the coagulation and the amount of the entrained air is also increased remarkably.

The water-soluble high polymer usable in this invention can include, for example, cellulose derivatives such as carboxymethylcellulose, methylcellulose, ethylcellulose, hydroxycellulose or hydroxypropylcellulose, polyvinyl alcohol, polyethylene glycol, starch, starch phosphoric acid ester, alginic acid, gelatin, or polymers or copolymers of polyacrylamide, polyoxyethylene or polyoxypropylene, copolymers of acrylic acid having amino groups in the molecule and quaternarized compounds thereof. The blending ratio between the cement dispersion agent and the water-soluble high polymer in this invention are preferably from 99.9:0.1 to 70:30 (weight ratio). Preferably, it is from 99:1 to 80:20 (weight ratio). If the blending ratio of the water-soluble high polymer is less than 0.1, it is not effective to the prevention of the slump loss. While on the other hand, if it is more than 30, the dispersing performance is reduced and it is disadvantageous from the economical point of view.

In the condesanate of melamine sulfonic acid with formaldehyde or the salt thereof for use in this invention, although there is no particular restriction for the molar ratio of formaldehyde combined to melamine, from 2 to 4 mol of bound formaldehyde is generally used per one mol of melamine. Further, there is no particular restriction to the molar ratio of sulfonic acid group bound to melamine. From 0.9 to 1.2 mol of the bound sulfonic acid group is usually used per one mol of melamine. Further, while there is no particular restriction for the viscosity of the condensate of melamine sulfonic acid with formaldehyde or the salt thereof in an 20% aqueous solution, 5 to 25 cP of the viscosity at 20° C. and pH 8.5 is preferred. Preferred blending ratios between the cement dispersion agent and the condensate of the melamine sulfonic acid with formaldehyde in this invention are from 95:5 to 20:80 (weight ratio) and, preferably, from 90:10 to 40:60 (weight ratio). If the blending ratio of the condensate of melamine sulfonic acid with formaldehyde or the salt thereof is less than 5, it is not effective for the prevention of the slump loss. While on the other hand, if it is more than 80, the dispersing performance is reduced and it is disadvantageous from the economical point of view.

In this invention, the water-reducing agent can also be used. In the case of using the water-reducing agent together, it may previously be mixed with an aqueous solution of polycarboxylic acid or the salt thereof, condensate of naphthalene sulfonic acid with formaldehyde or the salt thereof or a condensate of melamine sulfonic acid with formaldehyde or the salt thereof, or with a water-reducing agent such as lignin sulfonic acid salt. Further, it is also possible to previously blend one of them with cement or cement blends or to blend and knead one of them with cement or cement blends and then blend the other of them therewith.

Further, in this invention, other cement additives can also be used in combination, for example, AE water-reducing agent, superplasticizer, (super) retarder, accelerator, foaming agent, defoaming agent, water-preserving agent, thickener, self-levelling agent, water proof agent, inhibitor, pigment, corrosion inhibitor, fungus inhibitor, cracking reducer, high polymer emulsion and like other surface active agent, expensive admixture, glass fiber, fly ash, cinder ash, clinker ash, husk ash, blast furnace slug, silica fume, silica powder and the like.

The cement additives generally known are described in "Concrete Engineering" written by Takakazu Maruyasu and Shunichi Mizuno, published from Corona Co. in 1982, "Knowledge for the Cement Concrete" edited by Junji Yamada, published from Keizai Chosakai (Foundation) in 1973 or "Collective Data for New Surface Active Agent", p941–958, written by Kenichi Hattori and Toshihiro Azuma, published from Keiei Kaihatsu Center Publisher etc.

There is no particular restriction for the order of adding the cement additives and the cement dispersion agent of this invention and it is, for example, possible to add the additive after adding the dispersion agent of this invention, or add the dispersion agent of this invention after adding the additives. Further, the additives and the dispersion agent according to this invention can be added simultaneously.

Since the dispersibility can be improved greatly as compared with conventional condensates of naphthalene sulfonic acid with formaldehyde (or the salts thereof) and condensates of melamine sulfonic acid with formaldehyde (or the salts thereof) without giving undesired effects of delaying the curing and of air entrainment in concretes, the cement dispersion agent according to this invention can be used in various application uses.

For instance, the cement dispersion agent according to this invention can be used as the dispersion agent at the low addition region for use in medium-low strength concretes. In this region, lignin sulfonic acids or carboxylic acids have hitherto been used since they are considered to give less undesirable effects in the curing retardation and the entrainment due to the low addition amount. However, there has been a strong demand also in this region that the cracking in the concrete due to drying shrinkage or the like be suppressed. However, there have been mixing agents capable of satisfying the demand. The cement dispersion agent of this invention causes no undesired effects of delaying of the curing or air entrainment and, further, shows high dispersibility also in the low addition region. It is also possible to decrease the unit amount of paste and remarkably decrease the crackings in the concrete due to drying shrinkage or the like.

As another example, the cement dispersion agent of this invention can be an excellent dispersion agent from the economical point of view also in the field of high strength concrete and in the high addition region.

Further, since the slump loss preventing function can be improved and the workability of the concrete can be kept for a long period of time by blending the cement dispersion agent according to this invention with the high molecular ingredient, the cement dispersion agent according to this invention can be used in other fields of application.

For instance, it can be used as the aid for transporting the concrete through pumping. While the cement blends are applied by way of the pumping, in the case where the pumping transportation is temporarily interrupted such as during a noon recess, upon replacing work for the steps or by machine troubles, if the pumping is interrupted for a long time, workability of the concrete in the pumping pipeways is reduced to bring about problems such as abrupt increase in the pumping pressure upon re-starting the pumping or cloggings in the pipeways.

However, if the cement dispersion agent according to this invention is added, the concrete workability can be kept constant to prevent the reduction in the fluidity thereby preventing the pressure rise upon restarting the pumping after the interruption of the pumping to there remarkably improve the effect of the pumping work.

As a further example, it is also effective as the grouting aid for cement milk or mortar, cement blends applied from Tremie pipe, submerged concrete, concrete for use in continuous underground walls, spray concrete, centrifugally molded concrete and vibration packed concrete for keeping fluidity and preventing the separation of materials.

DESCRIPTION OF THE PREFERRED EMBODIMENT

This invention now will be described more specifically by referring to the examples but this invention is not limited only thereto.

EXAMPLES 1—21

Comparative Examples 1–4

Experiment was made for examining the effect on the dispersiblity and the compression strength of concretes of the dispersion agent according to this invention indicated by product Nos. 1–9 and comparative dispersing agents shown in Table 2. The concrete used was composed of the materials described below and prepared in the formulation shown in Table 1.

Further, an experiment was also made for examining the effect on the slump loss preventing performance and the compression strength of the concrete of the dispersion agent indicated by products Nos. 6 and 10–21 shown in Table 6 (products No. 10–21 were prepared by mixing the high molecular ingredient with the product No. 1). The concrete used was composed of the materials described below and prepared in the formulation shown in Table 5.

The dispersibility and slump loss preventing performance were measured by the slump test according to JIS A 1101 and air amount test according to JIS A 1128. The coagulation time measuring test was according to ASTM C 403-65T, while the compression strength test was according to JIS A 1108.

Experimental conditions are shown in Tables 3 and 6 and the results of the test are shown in Tables 4 and 7.

Materials Used

Cement (C): Ordinary portland cement (specific gravity: 3.17)

Fine aggregate (S): River sand from Kinokawa (specific gravity: 2.57)

Coarse aggregate (G): Pulverized stones from Takarazuka (specific gravity: 2.59)

Water (W): Tap water

AE agent: Mighty AE-03 (trade name of products manufactured by Kao Co.)

The AE agent was used as required.

Method of Kneading Concrete

Method-1: The cement dispersion agent was previously kneaded and dissolved in water, and then 50 liters of concrete were kneaded at 20° C. for 3 minutes in total by using a 100 liter compulsory mixer. The charging sequence and the kneading time for the materials are as follows

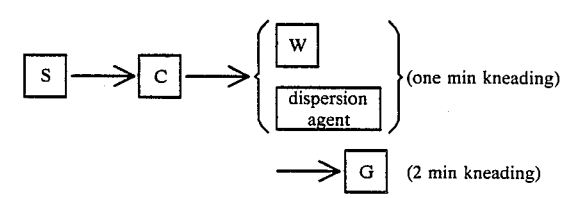

Method-2: The same procedures as in the method-1 were carried out except for kneading the cement dispersing agent and adding it separately from the water. The materials were charged in the sequence as described below.

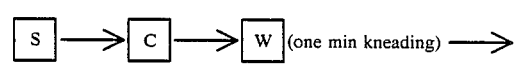

-continued

Method-3: The cement dispersion agent was previously kneaded and dissolved in water, 50 liter of concrete were mixed over two minutes at 20° C. by using a 100 liter tilted mixer and then the slump and the air amount were measured for a predetermined of time while stirring at low speed of 4 rpm.

Steam Cure

Concretes prepared in the Methods-1 and 2 were collected in a cylindrical frame of $\phi 10 \times 20$ cm, and then stood still at room temperature of 20° C. for 3 hours. Then, the frame was transferred into a steam curing vessel and the temperature was increased to 65° C. at a rate of 20° C./H. Then, they were steam-cured at 65° C. for three hours and then allowed to cool to room temperature. They were removed from the frame after 24 hours and the compression strength was measured. Other specimens were cured in water at 20° C. for 28 days and the compression strength was measured.

Formulation

TABLE 1

| W/C | S/S + G | Unit amount (kg/m³) | | | |
|---|---|---|---|---|---|
| (%) | (%) | C | W | S | G |
| 42.2 | 40.0 | 450 | 190 | 671 | 1020 |

Preparation Example for Cement Dispersion Agent
(Preparation Example 1)

208 g of naphthalene sulfonic acid, 45 g of methyl naphthalene sulfonic acid, 10 g of 98% sulfuric acid and 50 g of water were charged in a 500 ml flask and then warmed to 80° C. Then, 140 g of 37% formalin were added dropwise at 80°–90° C. over 5 hours. Then, 1.3 g of ferrous sulfate were added and 254 g of 60% hydrogen peroxide were added dropwise at 60° C. over 5 hours. Then, the solution was adjusted to weakly alkaline by sodium hydroxide and then filtered to obtain a cement dispersion agent according to this invention.

The carboxylic group introduced was 1.9 mol/kg, the molecular weight distribution characteristics F300-27500 occupied 88%, the monomer content was 0.1 mol % and the contents of the constitutional units in the molecule defined by (I), (II) and (III) were 15, 9 and 11 mol % respectively (Product No. 1)

(Preparation Example 2)

1.5 g of titanium oxide were added instead of the ferrous sulfate and the hydrogen peroxide in Preparation Example 1 and a high pressure mercury lamp (UM-102, manufactured by Ushio Denki) placed in a quartz tube was used for irradiation over 40 hours. Then, the solution was adjusted to a weakly alkaline region by sodium hydroxide and filtered to obtain the cement dispersion agent according to this invention.

The carboxylic group introduced was 1.6 mol/kg, the molecular weight distribution characteristics F300-27500 occupied 90% by weight, the monomer content was 0.1 mol % and the contents of the constitutional units in the molecule defined by (I), (II) and (III) were 12, 11 and 10 mol % respectively (Product No. 8).

Preparation Example 3

After dropping formalin in the Preparation Example 1, the solution was adjusted to a weakly alkaline region by sodium hydroxide, ozone was evolved from air by using an ozonizer (type OS-1N: manufactured by Mitsubishi Electrical Co.) and blown at a room temperature for 3 hours to obtain a cement dispersion agent according to this invention.

The carboxylic group introduced was 1.5 mol/kg, the molecular weight distribution characteristics F300-27500 occupied 85% by weight, the monomer content was 0.1 mol % and the contents of the constitutional units in the molecule defined by (I), (II) and (III) were 11, 12 and 11 mol % respectively (Product No. 9).

The dispersion agents of the products Nos. 2–5 were obtained according to Preparation Example 1.

The analytical values for the dispersion agents according to this invention and the comparative dispersing agents thus obtained are shown in Table 2.

TABLE 2

| Product No. | Starting material for reaction | Oxidizing-polymerizing agent | Product (mol %)*4 | | | Carboxylic group (mol/kg) | Molecular weight distribution characteristics F300-27500 (wt %) | Monomer (mol %)*5 |
|---|---|---|---|---|---|---|---|---|
| | | | (I) | (II) | (III) | | | |
| 1 | (NS/MNS)F*1 | hydrogen peroxide + ferrous sulfate | 15 | 9 | 11 | 1.9 | 88 | 0.1 |
| 2 | NSF*2 | hydrogen peroxide + ferrous sulfate | 18 | 10 | 15 | 2.5 | 93 | 0.1 |
| 3 | (NS/MNS)F | hydrogen peroxide + cuprous sulfate | 14 | 9 | 10 | 1.5 | 86 | 0.2 |
| 4 | (NS/MNS)F | n-butyl hydroperoxide + cobaltous sulfate | 14 | 8 | 9 | 1.3 | 85 | 0.2 |
| 5 | NS*3 | hydrogen peroxide + ferrous sulfate | 20 | 15 | 17 | 2.8 | 80 | 0.1 |
| 6 | (NS/MNS)F | potassium permanganate | 6 | 0 | 5 | 0.8 | 75 | 2.8 |
| 7 | (NS/MNS)F | — | 0 | 0 | 0 | 0.0 | 70 | 2.9 |
| 8 | (NS/MNS)F | photoirradiation + titanium oxide | 12 | 11 | 10 | 1.6 | 90 | 0.1 |
| 9 | (NS/MNS)F | ozone | 11 | 12 | 11 | 1.5 | 85 | 0.1 |

(note)
*1(NS/MNS)F: copolycondensate of naphthalene sulfonic acid/methylnaphthalene sulfonic acid with formaldehyde at a ratio of 83/17
*2NSF: condensate of napthalene sulfonic acid with formaldehyde
*3NS: naphthalene sulfonic acid
*4Content of the constituent ingredients in the product as defined by (I), (II) and (III)
*5Content of naphthalene sulfonic acid and/or methylnaphthalene sulfonic acid or the salts thereof.

TABLE 3

| | Dispersion agent | Addition amount* | Kneading method |
|---|---|---|---|
| Example 1 | Product No. 1 | 0.35 | Method-1 |
| Example 2 | Product No. 2 | 0.35 | Method-1 |
| Example 3 | Product No. 3 | 0.35 | Method-1 |
| Example 4 | Product No. 4 | 0.35 | Method-1 |
| Example 5 | Product No. 5 | 0.35 | Method-1 |
| Example 6 | Product No. 8 | 0.35 | Method-1 |
| Example 7 | Product No. 9 | 0.35 | Method-1 |
| Example 8 | Product No. 1 | 0.25 | Method-2 |
| Example 9 | Product No. 3 | 0.25 | Method-2 |
| Comparative Example 1 | Product No. 6 | 0.45 | Method-1 |
| Comparative Example 2 | Product No. 7 | 0.50 | Method-1 |
| Comparative Example 3 | Product 7 | 0.35 | Method-2 |

*weight % based on cement (solid content)

TABLE 4

| Example and Comparative Example No. | Slump (cm) | Air amount (%) | Coagulation time (hr-min) Starting time | Coagulation time (hr-min) End time | Compression strength (kgf.cm$^2$) Steam cure 1 day | Compression strength (kgf.cm$^2$) Steam cure 28 day | Standard cure 28 day |
|---|---|---|---|---|---|---|---|
| Comparative Example 1 | 10.4 | 1.5 | 4-38 | 5-40 | 251 | 510 | 570 |
| Comparative Example 2 | 10.5 | 1.4 | 4-32 | 5-50 | 255 | 513 | 572 |
| Example 1 | 11.0 | 1.3 | 4-35 | 5-56 | 262 | 519 | 578 |
| Example 2 | 10.4 | 1.0 | 4-27 | 5-45 | 257 | 515 | 575 |
| Example 3 | 10.7 | 1.1 | 4-30 | 5-48 | 259 | 516 | 577 |
| Example 4 | 10.6 | 1.2 | 4-25 | 5-42 | 261 | 518 | 576 |
| Example 5 | 10.8 | 1.3 | 4-38 | 5-55 | 260 | 520 | 579 |
| Example 6 | 10.9 | 1.0 | 4-35 | 5-50 | 260 | 515 | 575 |
| Example 7 | 10.5 | 1.1 | 4-25 | 5-45 | 262 | 520 | 578 |
| Comparative Example 3 | 10.6 | 1.5 | 4-25 | 5-41 | 252 | 511 | 570 |
| Example 8 | 10.9 | 1.3 | 4-30 | 5-45 | 257 | 516 | 576 |
| Example 9 | 10.7 | 1.2 | 4-23 | 5-38 | 259 | 518 | 579 |

TABLE 5

| W/C (%) | S/S + G (%) | Unit amount (kg/m$^3$) C | Unit amount (kg/m$^3$) W | Unit amount (kg/m$^3$) S | Unit amount (kg/m$^3$) G | Aimed air amount (%) | Aimed slump (cm) |
|---|---|---|---|---|---|---|---|
| 55 | 47 | 320 | 175 | 825 | 938 | 4 | 21 |

TABLE 6

| Product No. | Concrete dispersion agent Invented product (A) | Concrete dispersion agent High polymer ingredient (B) | Blending ratio A:B | Addition amount*[1] | Kneading Method |
|---|---|---|---|---|---|
| 6 | — | — | — | 0.50 | Method-3 |
| 10 | Product No. 1 | — | 100:0 | 0.40 | Method-3 |
| 11 | Product No. 1 | PMA*[2] | 80:20 | 0.40 | Method-3 |
| 12 | Product No. 1 | PAA*[3] | 80:20 | 0.45 | Method-3 |
| 13 | Product No. 1 | PPM*[4] | 80:20 | 0.35 | Method-3 |
| 14 | Product No. 1 | PBM*[5] | 80:20 | 0.35 | Method-3 |
| 15 | Product No. 1 | PVA*[6] | 95:5 | 0.40 | Method-3 |
| 16 | Product No. 1 | HEC*[7] | 95:5 | 0.35 | Method-3 |
| 17 | Product No. 1 | EPO*[8] | 95:5 | 0.45 | Method-3 |
| 18 | Product No. 1 | MSF*[9] | 70:30 | 0.45 | Method-3 |
| 19 | Product No. 1 | MSF | 40:60 | 0.55 | Method-3 |
| 20 | Product No. 1 | LS*[10] | 70:30 | 0.38 | Method-3 |
| 21 | Product No. 1 | LS | 50:50 | 0.35 | Method-3 |

(note):
*[1]: solid content weight % based on cement weight
*[2]PMA: sodium methacrylate
*[3]PAA: sodium polyacrylate
*[4]PPM: sodium salt of α-pentene maleic acid copolymer
*[5]PBM: sodium salt of isobutylene maleic acid copolymer
*[6]PVA: polyvinyl alcohol
*[7]HEC: hydroxyethylcellulose
*[8]EPO: copolymer of oxyethylene and oxypropylene
*[9]MSF: sodium salt of condensate of melamine sulfonic acid with formaldehyde
*[10]LS: sodium lignosulphonate

TABLE 7

| Example and Comparative Example No. | Product No. | Initial slump (cm) | Slump residue (%)*[1] after 30 min | Slump residue (%)*[1] after 60 min | Slump residue (%)*[1] after 120 min | Air amount (%) after 0 min | Air amount (%) after 60 min | Compression strength (kgf/cm$^2$) after 3 day | Compression strength (kgf/cm$^2$) after 7 day | Compression strength (kgf/cm$^2$) after 28 day |
|---|---|---|---|---|---|---|---|---|---|---|
| Comparative Example 4 | 6 | 22.2 | 90 | 78 | 58 | 4.5 | 3.0 | 191 | 251 | 354 |
| Example 10 | 10 | 22.0 | 92 | 80 | 60 | 4.4 | 3.2 | 190 | 253 | 355 |
| Example 11 | 11 | 22.3 | 95 | 90 | 84 | 4.5 | 4.0 | 195 | 255 | 361 |
| Example 12 | 12 | 21.9 | 97 | 93 | 86 | 4.3 | 4.0 | 189 | 251 | 350 |

TABLE 7-continued

| Example and Comparative Example No. | Product No. | Initial slump (cm) | Slump residue (%)[*1] | | | Air amount (%) | | Compression strength (kgf/cm$^2$) | | |
|---|---|---|---|---|---|---|---|---|---|---|
| | | | after 30 min | after 60 min | after 120 min | after 0 min | after 60 min | after 3 day | after 7 day | after 28 day |
| Example 13 | 13 | 22.0 | 96 | 91 | 85 | 4.4 | 4.1 | 193 | 252 | 357 |
| Example 14 | 14 | 21.8 | 97 | 92 | 88 | 4.4 | 4.0 | 191 | 250 | 354 |
| Example 15 | 15 | 22.2 | 95 | 91 | 84 | 4.6 | 4.3 | 188 | 249 | 358 |
| Example 16 | 16 | 21.9 | 97 | 92 | 85 | 4.5 | 4.2 | 190 | 251 | 356 |
| Example 17 | 17 | 22.4 | 95 | 91 | 84 | 4.5 | 4.1 | 194 | 254 | 358 |
| Example 18 | 18 | 22.3 | 96 | 91 | 83 | 4.6 | 4.3 | 192 | 250 | 355 |
| Example 19 | 19 | 22.0 | 97 | 93 | 85 | 4.5 | 4.3 | 191 | 256 | 359 |
| Example 20 | 20 | 21.8 | 95 | 90 | 83 | 4.4 | 4.0 | 193 | 255 | 360 |
| Example 21 | 21 | 22.1 | 95 | 91 | 84 | 4.5 | 4.2 | 190 | 251 | 354 |

Note
[*1] slump residue rate = $\frac{\text{Slump after predetermined time}}{\text{Initial slump}} \times 100$ It is apparent from the result of the Table 4 that the dispersion agent according to this invention can provide extremely excellent effect in view of the dispersing effect, coagulation time, air entrainment and compression strength.

Further, it is also apparent that the chemical admixture comprising the dispersion agent according to this invention blended with a high molecular can ingredient provide excellent effect in view of the slump loss preventing effect and compression strength.

What is claimed is:

1. A cement dispersion agent which comprises a product prepared by oxidizing and polymerizing a condensate of formaldehyde with at least one of a naphthalenesulfonic acid salt and an alkyl-naphthalenesulfonic acid salt, said condensate containing a main constitutional unit having the formula:

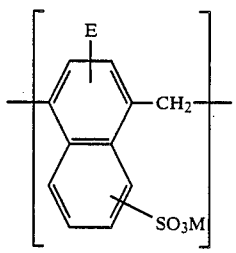

in which E is hydrogen or an alkyl having 1 to 3 carbon atoms and M is an alkali metal, an alkaline earth metal or an amino group, said product comprising:

(I) 1 to 30 mol percent of a first modified constitutional unit produced by oxidation and cutting of the methylene group of said main constitutional unit, and having the formula,

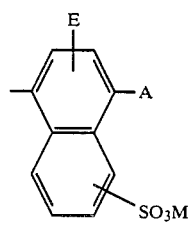

in which A is —OH, —CH$_2$OH or —COOH and E and M are as defined above, (II) a total of 1 to 30 mol percent of one or more of second modified constitutional units produced by hydroxylation and condensation polymerization, and having the formulae

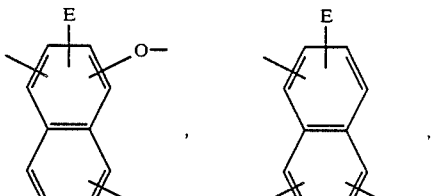

in which A, E and M are as defined above, (III) a total of 1 to 30 mol percent of one or more of third modified constitutional units produced by the oxidation and the ring-opening of the naphthalene ring, and having the formulae

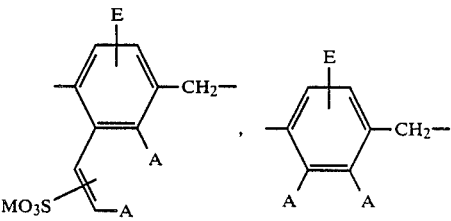

in which A, E and M are as defined above, and the balance being essentially unmodified main constitutional unit.

2. A cement dispersion agent as claimed in claim 1, in which the product contains a total of from 10 to 60 mol percent of (I), (II) and (III).

3. A cement dispersion agent as claimed in claim 1, in which the product contains 5 to 15 mol percent of the unit (I), 5 to 15 mol percent of the unit (II) and 5 to 15 mol percent of the unit (III).

4. A cement dispersion agent as claimed in claim 1, in which said salt is a salt with sodium, potassium, calcium, ammonium, an alkanolamine, N-alkyl-substituted polyamine, ethylene diamine, polyethylenepolyamine, polyethyleneimine or an alkylene oxide adduct.

5. The cement dispersion agent as claimed in claim 1, in which the oxidation and polymerization of said condensate are effected by dissolving 100 parts by weight of said condensate in 200 to 2000 parts by weight of water to form a first solution, adding 0.1 to 20 parts by weight of a metal ion to the first solution to form a second solution, said first solution being at a temperature from room temperature to the boiling point thereof, and adding 5 to 100 parts by weight of a water-soluble peroxide dropwise to said second solution.

6. The cement dispersion agent as claimed in claim 1, in which said condensate is a copolycondensate of naphthalene sulfonic acid and methyl naphthalene sulfonic acid with formaldehyde with a weight ratio of naphthalene sulfonic acid to methyl naphthalene sulfonic acid of 83/17.

7. The cement dispersion agent as claimed in claim 6, in which hydrogen peroxide is used as an oxidizing agent and ferrous sulfate is used as a polymerizing agent.

8. The cement dispersion agent as claimed in claim 7, in which the product contains 15 mol percent of unit (I), 9 mol percent of unit (II) and 11 mol percent of unit (III).

9. In a method of dispersing a hydraulic cement composition, the improvement comprising adding the cement dispersion agent of claim 1 to the hydraulic cement composition in an amount of 0.1 to 1.5 percent by weight of said cement dispersion agent, based on the solids content of said hydraulic cement composition.

10. A method as claimed in claim 9, in which said agent is used in combination with a slump-loss preventing polymer agent selected from the group consisting of polycarboxylic acids and salts thereof, lignin sulfonic acids and salts thereof, condensates of melamine sulfonic acid with formaldehyde and salts thereof, carboxymethylcellulose, methylcellulose, ethylcellulose, hydroxycellulose, hydroxypropyl cellulose, polyvinyl alcohol, polyethylene glycol, starch, starch phosphoric acid ester, alginic acid, gelatin, acrylamide polymers, oxyethylene polymers, oxypropylene polymers, polymers of acrylic acid having amino groups in the molecule and qauternarized compounds thereof.

11. The method of claim 9, in which said cement dispersion agent is added to the hydraulic cement composition in an amount of 0.35 percent by weight of said cement dispersing agent, based on to the solids content of said hydraulic cement composition.

12. A cement dispersing agent consisting essentially of a product prepared by oxidizing and polymerizing a condensate of formaldehyde with a npahthalene sulfonic acid salt or an alkylnaphthalenesulfonic acid salt, at least 80 percent by weight of said product having an average molecular weight, measured by gel permeation chromatography, of from 300 to 27,500, said product containing from 0.1 to 10 mol/kg of carboxyl groups, said product containing (I) from 5 to 15 mol percent of structural units having the formula

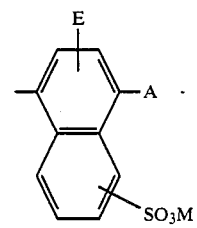

in which A is —OH, CH$_2$OH, or —COOH, E is hydrogen or alkyl having 1 to 3 carbon atoms, and M is an alkali metal, alkaline earth metal or amine, (II) from 5 to 15 mol percent of structural units having one or more of the following formulas

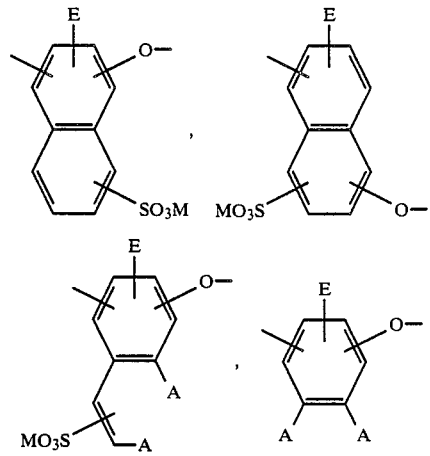

in which A, E and M have the same meanings as defined above (III) from 5 to 15 mol percent of structural units having one or more of the following formulas

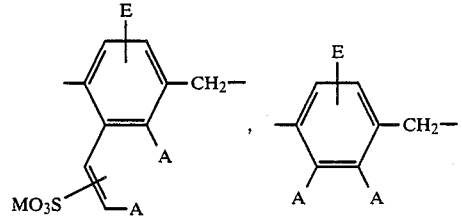

in which A, E and M have the same meanings as defined above, and the balance is essentially structural units of the formula

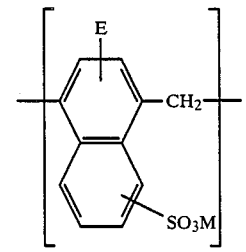

in which E and M have the same meanings as defined above, said product containing from 20 to 50 mol percent of (I) plus (II) plus (III).

13. A cement composition comprising hydraulic cement, aggregate and from 0.1 to 1.5 percent by weight of the cement dispersing agent of claim 12, based on the solids in said composition.

* * * * *